Patented July 30, 1929.

1,722,746

UNITED STATES PATENT OFFICE.

JOHN HASLING, JR., OF BALTIMORE, MARYLAND, ASSIGNOR, BY MESNE ASSIGNMENTS, TO THE FLEISCHMANN COMPANY, A CORPORATION OF OHIO.

METHOD OF YEAST MANUFACTURE.

No Drawing.   Application filed December 30, 1924.   Serial No. 758,953.

My invention relates to the manufacture of yeast and has for its objects the provision of means for manufacturing yeast of high quality at much lower costs than has heretofore been found practicable. As will appear from the following description, the use of my invention has many advantages in its economy and controllability.

An example of the manner in which my process may be carried out is as follows:

A yeast nutrient solution is prepared from molasses, cereal grains and inorganic salts, which have been suitably treated as is well known in the art. An aliquot of this nutrient solution is then run into the fermenter, diluted to about 2° Balling and the temperature raised to about 31°–33° C.

When using a fermenter of approximately 800 gallons capacity a suitable amount of nutrient solution to be placed therein initially has been found to be a total of about 666 gallons at 2° Balling and to this dilute nutrient solution approximately 100 pounds of seed yeast is added. Aeration of the fermenter is then commenced and while maintaining the temperature constant the aeration is continued until the amount of yeast in the fermenter is approximately ½ again as much as the seed yeast used; this condition being attained in about 2½ hours as evidenced when about 500 cc. of the nutrient solution filtered on a Büchner funnel gives approximately 20 grams of yeast.

At this stage of the process approximately ⅓ of the nutrient solution, or, in the example given about 222 gallons of nutrient solution, is withdrawn and the yeast contained therein is separated from the beer. The initial conditions in the fermenter are then approximately restored by adding thereto approximately 222 gallons of fresh nutrient solution of about 2° Balling, whereupon the aeration is continued and the cycle repeated as long as desired and while the quality of the yeast produced is retained. Also at the time of adding fresh nutrient solution a small amount of water, as for example, 10 gallons may be added if desired to compensate for any evaporation losses due to aeration.

In its simple aspects therefore the process is characterized by the fact that the seed yeast is allowed to increase about 50% in amount, at which time approximately 33⅓% is withdrawn and separated leaving substantially the original amount of seed yeast in the fermenter, whereupon the nutrient solution withdrawn is replaced with fresh nutrient solution and the cycle repeated.

In carrying out the process it has been found to be desirable to use a fermenter which is closed at the top and which remains closed from direct contact with the atmosphere throughout the period of propagation. The air used for aeration is, of course, freed from micro-organisms, dust, etc., by cleaning or filtering the same in the usual manner; and by carrying out the process in the manner described and with a closed fermenter I have succeeded in obtaining more than 20 successive yields of high quality yeast in one fermenter.

It will be obvious that the process of my invention not only greatly shortens the time for yeast production but also accomplishes substantial savings of costs, as only one stock, or batch, of seed yeast is used and one fermenter is enabled to produce as much yeast as several fermenters otherwise would.

The example which I have given of my process is merely illustrative and many modifications and variations of it are possible without departing from the spirit of my invention which is contained in the following claims.

Having described my invention what I claim as new and desire to secure by Letters Patent, is:—

1. A process of manufacturing yeast which comprises initiating propagation of yeast in a dilute yeast nutrient solution in a closed fermenter at a temperature of 31°–33° C., aerating the liquid by introducing cleaned air thereto while retaining the temperature approximately constant until the seed yeast has increased approximately 50%, thereupon withdrawing approximately ⅓ of the propagating liquid and separating the yeast therefrom, adding to the fermenter an amount of fresh nutrient solution approximately equal to the yeast containing liquid withdrawn and continuing the yeast propagation.

2. A process of manufacturing yeast, which comprises initiating propagation of the yeast in a dilute yeast-nutrient solution, aerating the liquid until the seed yeast is increased approximately 50%, thereupon withdrawing approximately one-third of the propagating liquid and separating the yeast therefrom, adding to the fermenter an amount of fresh nutrient solution approximately equal to the yeast-containing liquid withdrawn, and continuing the yeast propagation.

JOHN HASLING, Jr.